United States Patent [19]

Mackelburg et al.

[11] Patent Number: 4,905,211

[45] Date of Patent: Feb. 27, 1990

[54] PRECISION DOPPLER EFFECT COMPENSATOR

[75] Inventors: Gerald R. Mackelburg; Stanley J. Watson, both of San Diego; Jayson T. Durham, North Highland; Alan Gordon, San Diego, all of Calif.

[73] Assignee: The United States of America as represented by the Secretary of the Navy, Washington, D.C.

[21] Appl. No.: 326,951

[22] Filed: Mar. 22, 1989

[51] Int. Cl.$^4$ .......................................... H04B 11/00
[52] U.S. Cl. .................................. 367/134; 367/904; 455/40; 455/103; 375/6
[58] Field of Search ............... 367/134, 904; 455/102, 455/103, 104, 40; 375/6, 40; 381/34, 31

[56] References Cited

U.S. PATENT DOCUMENTS

| | | | |
|---|---|---|---|
| 3,295,107 | 12/1966 | Stalcup | 381/34 |
| 3,593,256 | 7/1971 | Gannon | 367/134 |
| 3,798,590 | 3/1974 | Jacobson et al. | 367/904 |
| 4,187,491 | 2/1980 | Lindstrum et al. | 367/125 |
| 4,349,915 | 9/1982 | Costas | 375/40 |
| 4,428,073 | 1/1984 | Verburgt | 367/134 |
| 4,432,079 | 2/1984 | Mackelburg et al. | 367/134 |
| 4,513,429 | 4/1985 | Roeder | 375/120 |

Primary Examiner—Thomas H. Tarcza
Assistant Examiner—Daniel T. Pihulic
Attorney, Agent, or Firm—Harvey Fendelman; Thomas G. Keough; Peter A. Lipovsky

[57] ABSTRACT

A precision Doppler effect compensator provides Doppler compensation in acoustic transmission by simultaneously sending a known reference signal with an information signal. The information signal and reference signal undergo identical Doppler effects. The compensator uses the Doppler shifted reference signal to sample the analog Doppler affected information signal. The analog information signals are digitally converted and stored in a first in first out shift register. The samples are read out of the FIFO at a rate corresponding to the frequency of a non-Doppler shifted reference signal so as to precisely reconstruct the information signal as transmitted. The samples read from the FIFO are reconverted from digital to analog form to be presented to a receiving modem for further information processing.

24 Claims, 9 Drawing Sheets

| IC9- | TRUTH TABLE | | | | | |
|---|---|---|---|---|---|---|
| CLK | D | R | S | Q | Q̄ | |
| ↗ | 0 | 0 | 0 | 0 | 1 | |
| ↗ | 1 | 0 | 0 | 1 | 0 | |
| ↘ | X | X | 0 | 0 | 0* | |
| X | X | 1 | 0 | 0 | 1 | ← NORMAL RESET |
| X | X | 0 | 1 | 1 | 0 | |
| X | X | 1 | 1 | 1 | 1 | ← SET SUPERSEDES RESET |

PRECISION DOPPLER EFFECT COMPENSATOR

STATEMENT OF GOVERNMENT INTEREST

The invention described herein may be manufactured and used by or for the Government of the United States of America for governmental purposes without the payment of any royalties thereon or therefor.

INCORPORATION BY REFERENCE

This application is related to U.S. Pat. No. 4,432,079 filed Feb. 14, 1984 titled SYNCHRONOUS/ASYNCHRONOUS INDEPENDENT SINGLE SIDE BAND ACOUSTIC TELEMETRY by Gerald R. Mackelburg et al incorporated by reference herein.

BACKGROUND OF THE INVENTION

1. Field of the Invention

This invention pertains broadly to the field of communications. More particularly, the invention pertains to Doppler compensations systems. In greater particularity, but without limitation thereto, the invention relates to a Doppler compensation system that provides precision Doppler correction to acoustic signals so that these signals may be readily utilized with high performance telephonic modems.

2. Description of the Prior Art

In a continuing effort to advance the state of underwater communications, acoustic engineers have sought to utilize high performance modems such as those commonly used in conjunction with telephonic communications. The great expenditures made by the industrial sector in perfecting these modems have made them an attractive alternative to producing yet another set of modems uniquely tailored for acoustic communications.

Modems developed for telephonic usage operate upon communications that travel at the speed of light, therefore they are designed with the expectation that the communications will experience negligible Doppler effects. As a result, these modems are typically designed to tolerate very slight frequency errors. Further, these high performance modems are usually not designed to tolerate a high degree of data rate error. In either case, if frequency or data rate errors are high, the modems suffer serious performance degradation.

Acoustic communications are particularly susceptible to effects in frequency and data rate due to the Doppler effect. This is due in part to changes in the orientation of an acoustic transmitter with respect to an acoustic receiver. It is typical for an acoustic transmitter to move with respect to an acoustic receiver or for the receiver to move with respect to the transmitter or for a combination of these. Because of the possibility of transmitters and receivers moving towards or away from each other at various rates, transmissions under these conditions can experience Doppler shifts varying both in magnitude and direction.

The effect of these movements upon transmission frequencies and data rates can be more readily understood by examining the effects upon one cycle of a transmitted sine wave. In the instance where a receiver moves away from a transmitter with the velocity v, the receiver in one cycle of a sine wave of frequency f will move v/f. This, in turn, makes the received wavelength v/f longer than the transmitted wavelength, which is c/f where c is the speed of sound in water. The received wavelength is thus (c+v)/f and the received frequency is thus:

$$[c/(c+v)] \cdot f = (1 - (v/c) - (v/c)^2 - \ldots) \cdot f$$

Since c=4900 feet/second, which is much greater than v (in knots), $$c/(c+v) \approx 1 - v/c = 1 - 0.00034$$

This amounts to a received frequency change of approximately 0.034 percent of the transmitted frequency per knot of velocity between the transmitter and receiver.

For example, an acoustic transmission from the output of a commercial modem through water on a representative 11.33 kilohertz sideband modulated carrier, if uncorrected, will result in a received frequency error of approximately (11.33 kilohertz) (0.034 per cent per knot)=3.85 hertz/knot at the receive commercial modem inputs.

High performance commercial modems typically used with telephone systems may tolerate some frequency differences between transmissions and receptions, however these modems can typically tolerate no more than 7 to 10 hertz of frequency errors without serious system downgrading. Yet frequency shifts of greater than 7 hertz are frequently encountered between acoustic transmissions and receptions, where differences in the velocity of receivers with respect to transmitters are often greater than 1.8 knots, at 3.85 hertz per knot frequency error.

Related to the shift in frequency is a corresponding shift in data rate. As previously discussed, the received data rate differs from the transmitted data rate by 0.034 per cent per velocity (knot) between the transmitter and receiver. As high performance modems operate with communications travelling at the speed of light and exhibiting very little Doppler effect, they are designed to accommodate very slight data rate shifts, typically on the order of no more than 0.02 per cent of received data rate error.

There exists a variety of methods and means for correcting Doppler effect affecting transmitted signals. One technique sends upper and lower reference frequencies enclosing an information band of frequencies. The difference between the reference frequencies, as Doppler effected, are multiplied by a selected multiplying factor so as to equal a predetermined constant. This technique is limited by the number of available multiplying factors and provides merely a rough correction for Doppler effect.

Another Doppler compensation means correlates a set of electrically Doppler effected replicas to a transmitted signal. A high correlation peak corresponds to the velocity and range of a moving target. As with the first described method this method is limited by a finite number of replicas available, resulting in a Doppler correction of less than desirable accuracy for some applications.

In yet another prior art scheme, a reference tone is transmitted along with information channels. The shift in the reference tone due to the Doppler effect is corrected accurately, and this correction is applied to information frequencies on either side of the reference frequency. Where the information frequencies occupy a relatively narrow band, the Doppler shift affecting the frequencies would be approximately the same as that affecting the reference tone, and the correction would be relatively accurate. Yet the more the information frequencies deviate from the reference tone, the more the correction becomes less and less precise. For some applications, this correction would be within the tolerances of the system's receiver.

While the above described prior art methods have proven to be satisfactory for their intended purposes, application of these methods to acoustic communications made by way of high performance modems would provide system performance that could be considered less than desirable.

SUMMARY OF THE INVENTION

The invention overcomes the shortcomings of the prior art by providing a precision Doppler effect compensator suitable for use with high performance, low Doppler effect tolerant, modems. At transmission, a known reference signal, such as a carrier frequency, is sent simultaneously with an information signal. As both the reference signal and the information signal are sent simultaneously from a single source, they both experience identical Doppler effects. A characteristic of the Doppler shifted reference signal, such as the signal's frequency, is utilized by the invention to sample the Doppler effected information signal. These samples are then "played back" to the receiving modem at a rate equal to a characteristic of a locally generated non-Doppler shifted reference signal corresponding to the reference signal sent at transmission. By utilizing well understood sampling theory, the information signal as originally transmitted is reconstructed precisely so as to be completely compatible with otherwise low Doppler effect tolerant high performance modems. This invention can be utilized with the synchronous/asynchronous independent single sideband acoustic telemetry apparatus disclosed in U.S. Pat. No. 4,432,079 by Gerald R. Mackelburg et al and incorporated by reference herein.

OBJECTS OF THE INVENTION

It is an object of the invention to enhance the efficiency of Doppler effected communications.

Another object of the invention is to precisely correct for the shifts in frequency and data rate of Doppler effected communications.

Yet another object of the invention is to precisely compensate for shifts in frequency and data rate of acoustic signals sent through water.

Still yet another object of the invention is to precisely compensate for shifts in frequency and data rate of acoustic transmissions through water so that high performance modems having a low tolerance for frequency errors and data rate errors may be utilized in underwater communications.

These as well as other objects, advantages and new features of the invention will become apparent from the following detailed description of the invention when considered in conjunction with the attached drawings.

BRIEF DESCRIPTION OF THE DRAWINGS

FIG. 3, made up of FIGS. 3A through D, is a schematic of a typical embodiment of the precision Doppler effect compensator disclosed in block diagram form in FIG. 1.

DESCRIPTION OF THE PREFERRED EMBODIMENT

Figure 1:
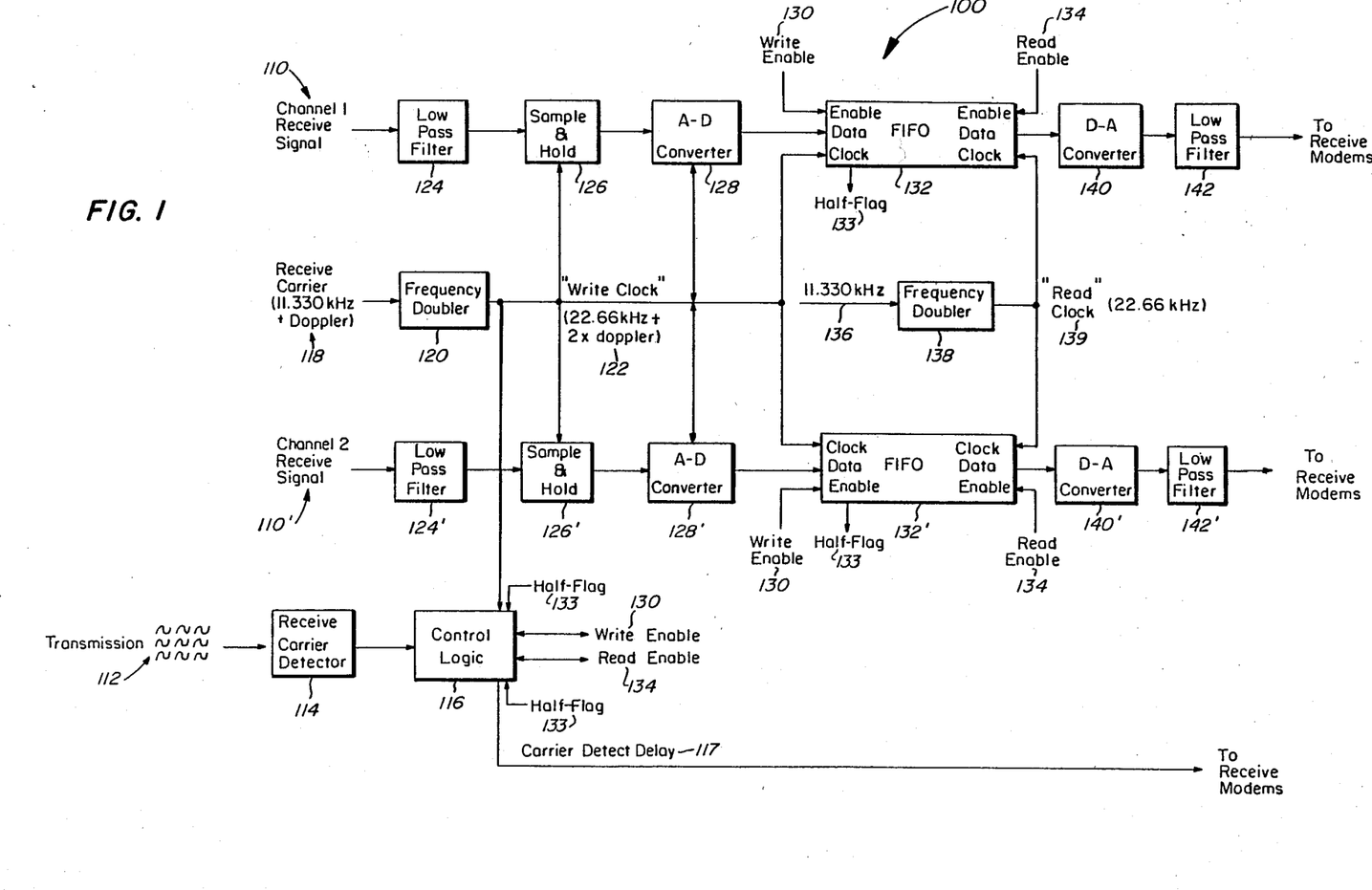
FIG. 1 is a block diagram of a representative embodiment of the invention as utilized for acoustic underwater transmissions.

Referring to FIG. 1 a block diagram illustrating a representative precision Doppler effect compensator 100 of the invention is shown. Doppler effect compensator 100 is set up to receive two channels of receive signals: a channel "one" receive signal, designated 110, and a channel "two" receive signal, designated 110'. Though in this specific representation of the invention two channels were incorporated, it should be understood that the invention is suitable for use with one channel or any channels a multiple thereof.

A transmission 112, such as an underwater acoustic transmission having an 11.33 kilohertz carrier with a single sideband modulation, is received or impinges upon a receive carrier detector 114. In this embodiment of the invention receive carrier detector 114 serves as an initial "filter" to screen out extraneous and unintended transmissions received from the acoustic transmission medium. Receive carrier detector 114 can be a narrowband energy detector used to detect the presence of energy in a preselected frequency band. One such band could be the transmission's carrier frequency. In this embodiment, the carrier frequency, when detected by carrier detector 114, initiates other elements of compensator 100 to an "alert" status so as to anticipate the reception of an intelligent communication.

Reception of the carrier permits a control logic 116, to be described, to instigate reception of Doppler effected transmissions to be processed by compensator 100.

Assuming that there is relative movement between a transmitter and receiver, a transmission of information from the transmitter will have experienced a Doppler effect, as this is well understood. In accordance with the invention an underwater transmitter, not shown, simultaneously sends an information signal along with a reference signal. Both the information signal and the reference signal will experience an identical Doppler effect as will be seen by Doppler effect compensator 100. This reference signal could be the carrier of the transmitted communication. In a preferred embodiment of the invention the carrier frequency was used as this reference signal, however those skilled in the art will realize that other frequencies, besides that of the carrier, could be used as a reference frequency. In the embodiment of the invention shown, a typical underwater acoustic carrier of 11.33 kilohertz was sent simultaneously with information modulated sidebands. Prior to modulation, each of these sidebands occupied a baseband of approximately 0 to 3 kilohertz.

Detection of the carrier by receive carrier detector 114 causes Doppler effect compensator 100 to receive the carrier frequency reference signal as affected by the Doppler effect, designated as 118. Simultaneously therewith baseband modulated information signals, which have been synchronously demodulated from the sideband, are received over channels 1 and 2, elements 110 and 110' respectively. Doppler affected receive carrier 118 is locked on by a phase locked loop 120 that also serves as a frequency doubler. Frequency doubler 120 can be, for example, a EXAR XR 2212 phase locked loop. The output of frequency doubler 120, a 22.66 kilohertz signal plus double the Doppler shift experienced by the received carrier reference signal, serves as a "write clock" 122 that will be used for further system functions as will be described.

The Doppler affected receive signals, 110 and 110', are treated in each channel by identical elements. In this regard those elements for channel 1 will be discussed primarily, and the reader may assume, unless otherwise directed, that those elements and processes affecting channel 1 are identical to those elements and processes affecting channel 2. The elements of channel 1 and channel 2 will be commonly numbered however, with channel 2 element numbers being primed to distinguish them from channel 1 element numbers.

Referring again to FIG. 1, Doppler affected receive signal 110 is passed to a low pass filter 124 to bandlimit the incoming signals. In a preferred embodiment of the invention low pass filter 124 was a one pole with cutoff frequencies of 4.7 kilohertz. The output of lowpass filter 124 is then passed to a sample-and-hold element 126. A commercially available sample-and-hold found suitable for this specific implementation of the invention was a Burr Brown SHC 76. On each cycle of write clock 122, sample-and-hold 126 is enabled to sample the analog waveform of the receive signal at the sample-and-hold's input. Because the Doppler effect affects the reference signal and received signals equally, the specific shifts caused by the Doppler effect are not calculated nor are these calculations found necessary. In accordance with the invention, the shifted reference signal in the form of write clock 122 is used to gage when to sample Doppler affected information signal 110. In this regard, well understood sampling theory was used to select the sampling rate or frequency of write clock 122, as well as to choose the band limitations imposed by low pass filters 124.

In a well understood way, sample-and-hold 126 holds the sampled analog signal so as to provide a stationary voltage for analog to digital (ADC) converter 128 which is simultaneously enabled by write clock 122 to start converting the analog waveform voltage into a digital value. Analog to digital converters 128 and 128' operate independently to convert the analog waveforms individual to their respective channels. Converters that may be used for this purpose are Burr Brown ADC 85C12.

An "end of the conversion" or "not busy" flag from ADC 128 sends a write enable 130 from control logic 116 to first in first out (FIFO) shift registers 132 and 132', hereafter referred to jointly as FIFOs. Write enable 130 enables the banks of the FIFOs to take the output of ADCs 128, 128' and store it into a storage cell of each FIFO. Both banks of FIFOs 132 and 132' are synchronized together by common input write clock 122. With each cycle of write clock 122, a new conversion is made so that the next sample of the receive signal is put into the FIFO thereby resulting in a sample for each cycle of write clock 122.

This sample, conversion and storage process continues as long as information is received by compensator 100. During the course of loading samples into each FIFO, the number of samples are counted. In accordance with the invention FIFOs 132 and 132' create a flag 133 upon being half filled. This flag, by way of control logic 116, provides a read enable 134 to the output of FIFO 132. Output of data from the FIFOs is clocked out by way of a locally generated reference signal 136 equivalent to the non-Doppler shifted receive carrier reference signal multiplied in frequency doubler 138 according to a proportionality factor equal to that used to multiply receive carrier reference signal 118. This frequency doubled local reference signal is used in the form of a 22.66 kilohertz square wave as a "read clock" 139 for reading data out of the FIFOs at a rate close to the rate of data being read into them.

If the Doppler effect is relatively small the write clock rate and read clock rate of FIFOs 132 and 132' will be very close and will permit data to be written into and to be read out of the FIFOs with little chance of over or under filling their storage capability.

In a preferred embodiment of the invention the FIFOs were selected of half full flag capability. This gives the optimum amount of time for writing in and reading out of the FIFOs regardless of whether incoming information signals are Doppler upshifted or downshifted. This is of course because an upshifted incoming signal will be written into the FIFO at a rate greater than the readout rate of the FIFO. The FIFOs are of a limited memory capability and accepting upshifted data will ultimately lead to an overflow of the FIFO. Conversely, where a Doppler downshift is experienced, the incoming information signal's writing into the FIFOs will be at a rate less than reading out. This could ultimately lead to a "dry" FIFO resulting in blank periods of data reading out.

Those skilled in the art will realize that alternatively to the selection of a half full flag FIFO, FIFOs of different characteristics could be selected. For example, if large Doppler upshifts were expected, the transmission data length could either be shortened or the memory of the FIFOs could be expanded. Conversely if large downshifts of transmissions could be expected, transmissions lengths could be increased or the FIFOs could be permitted to fill completely before enabling a readout. By utilizing a FIFO with a half full flag capability a happy median is struck.

The FIFOs incorporated with the representative Doppler compensator discussed is an Integrated Device Technology Incorporated IDT7204 first in first out 4096×9 with half full flag.

In a preferred embodiment of the invention, control logic 116, as will be discussed in greater detail, provides a delay 117 to a receiving modem used in conjunction with compensator 100, such as a Rockwell model R-24, so that the receiving modem does not initiate receive functions until half flag 133 is generated by FIFO 132. Similarly, this delay permits the receiving modems to continue to receive compensated data from FIFOs 132 though writing of data to the FIFOs has ceased. Once the FIFOs become half filled, the output of the FIFOs will become enabled and will continue to be enabled until such time as the FIFOs go empty. This reading out of the FIFOs happens independently of writing into the FIFOs. Referring again to FIG. 1 it can be seen that data outputted from FIFOs 132 and 132' is clocked out at "read clock" data rate 139' to digital to analog converters (DAC) 140 and 140'. An example of this converter available in commercial markets is the Burr Brown DAC 80P. The outputs of DACs 140 are passed to lowpass filters 142, such as Burr Brown UAF41 two pole Butterworths with cut-off frequencies of four kilohertz, to filter out extraneous signals caused by the sampling process. The outputs of lowpass filters 142 pass a Doppler compensated reconstructed receive signal to receive modems for further system processing.

Figure 2A:
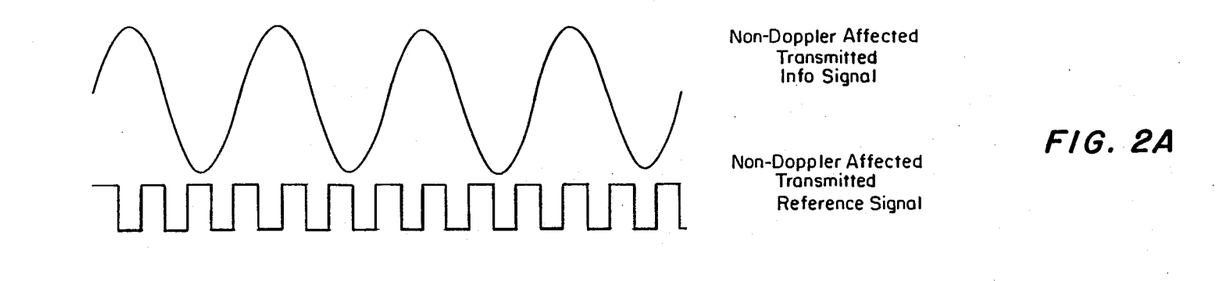
FIGS. 2A through 2C are graphical representations of the operation of the Doppler compensator of the invention upon a typical communication.
Figure 2B:
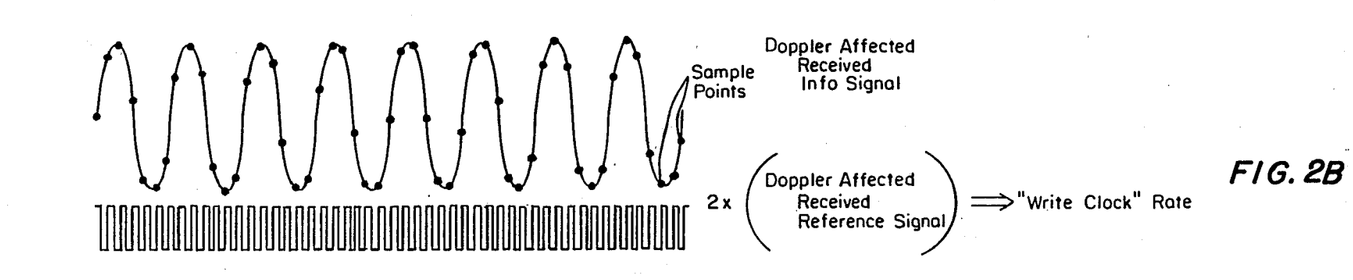

Referring now to FIG. 2, a graphical representation of the compensation process in accordance with the invention is shown. In FIG. 2A a representative information signal is shown as is transmitted simultaneously with a representative reference signal. Where a transmitter and receiver are closing with respect to each other, the non-Doppler affected signals depicted in FIG. 2A would be compressed such as those shown in FIG. 2B.

In FIG. 2B the Doppler affected receive information signal is sampled according to the Doppler affected receive reference signal as is appropriately multiplied according to sample theory. As previously discussed, these samples are stored in first in first out shift registers.

Figure 2C:
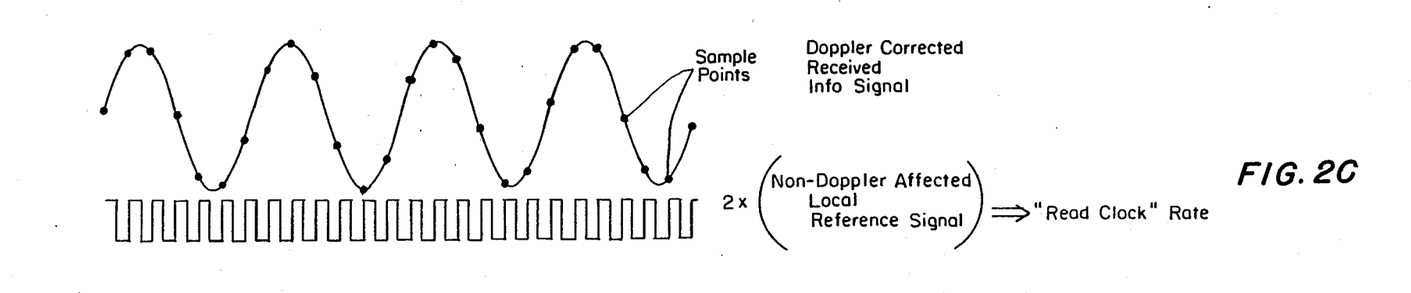
Figure 3A:
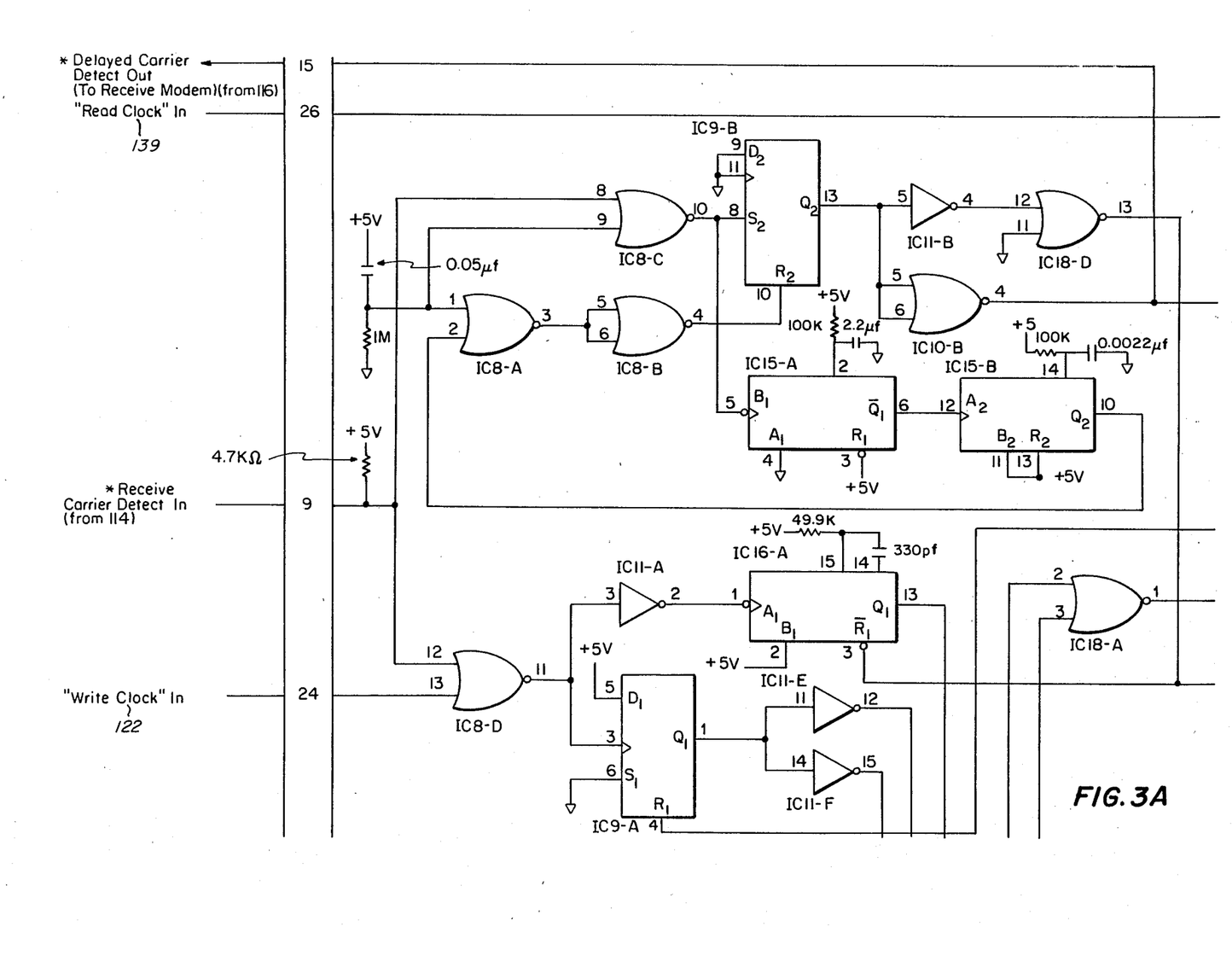
Figure 3B:
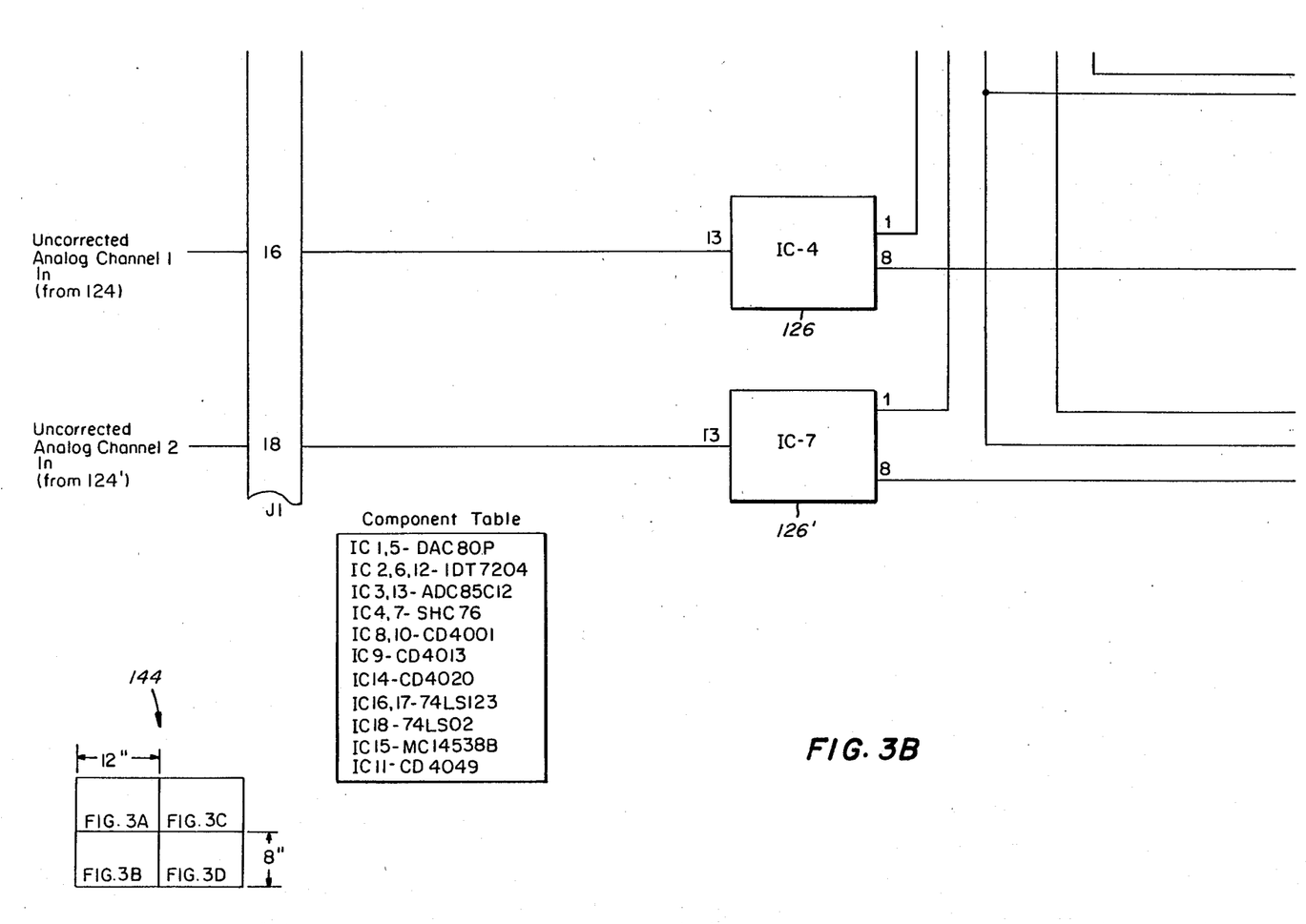
Figure 3C:
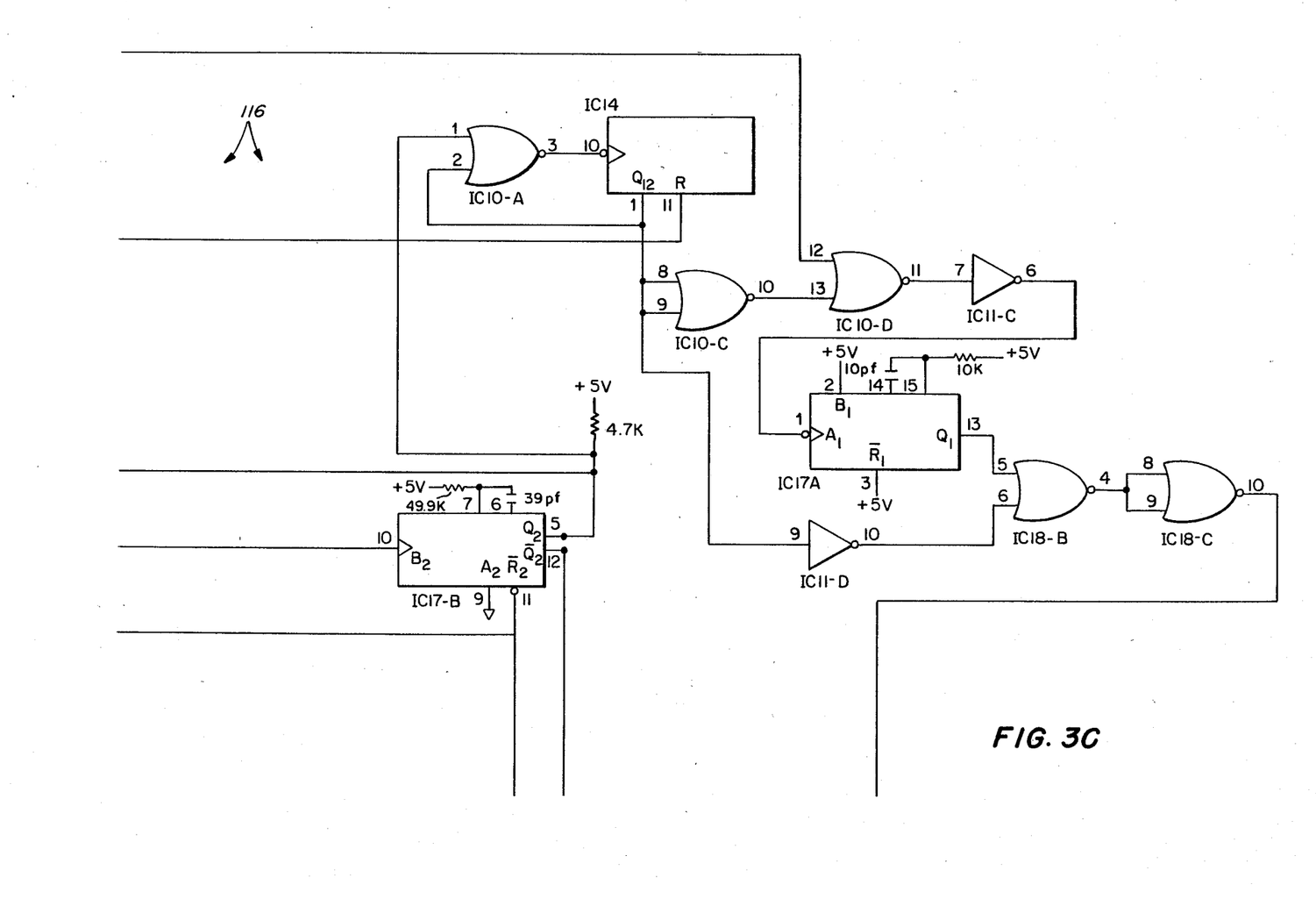
Figure 3D:
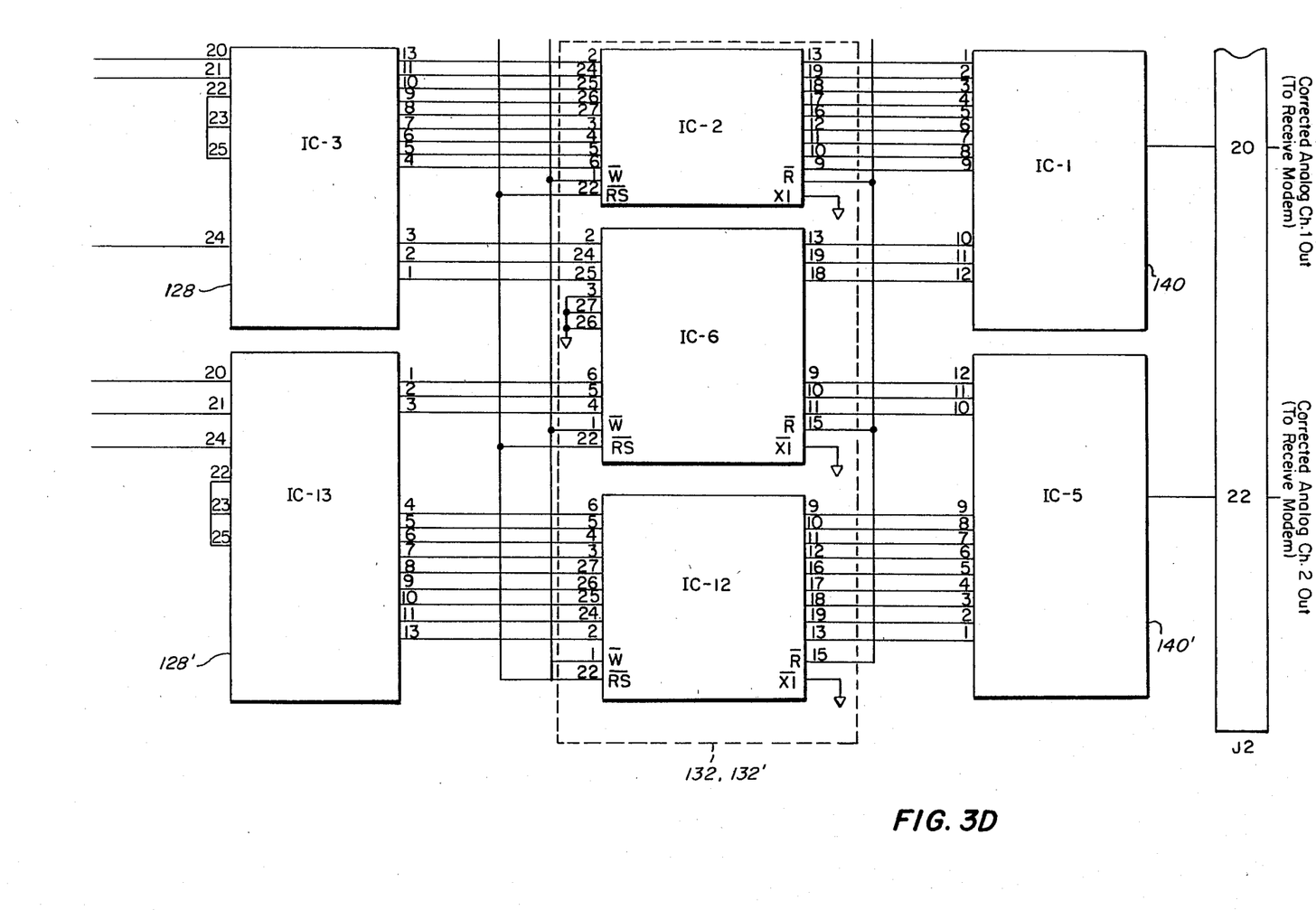

In FIG. 2C the stored samples are then read back out of the FIFOs according to a local non-Doppler affected reference clock thereby reconstructing the originally transmitted information signal as originally sent.

Turning now to FIG. 3, made of parts 3A, 3B, 3C and 3D, a schematic detail of Doppler effect compensator 100 is shown. In FIG. 3B there is shown a legend 144 as to the orientation of parts A, B, C and D of FIG. 3. FIGS. 4, 5, 6 and 7 are timing diagrams corresponding to elements of FIG. 3.

Referring now to FIGS. 1, 3, and 5 through 7, the details and operation of Doppler effect compensator 100 can be more readily understood. Control logic 116 is broken into three major areas. These areas are: write control logic, read control logic, and carrier detect and reset logic.

The write control logic function is to control the sample-and-hold, digitize and storage operations of compensator 100. As previously discussed, the carrier of a transmission is used to initiate Doppler effect compensator 100. When the presence of the carrier is detected, pin 12 of integrated circuit (IC) IC8-D goes low. Integrated circuit 8 is made up of elements A, B, C and D and are complementary metal oxide semiconductors (CMOS) quad two input NORs. These IC's are commercially available under the designation CD4001. Pin 12 of IC8-D going low serves to gate locally generated "write clock" 122 to write control logic elements. When no carrier is present, pin 12 of IC8 is high and the "write clock" 122 is inhibited. The gated "write clock" is available at pin 11 of IC8, see FIG. 4 "GATED WRITE CLOCK" and is connected to pin 3 of IC11 and pin 3 of IC9. Integrated circuit 11 is made up of elements A through F. Integrated circuit 11 is a CMOS hex inverter buffer driver and is commercially available under the designation CD4049. Integrated circuit 9 made up of elements A and B are CMOS D-flip flops such as those having the commercial designation CD4013.

Figure 4:
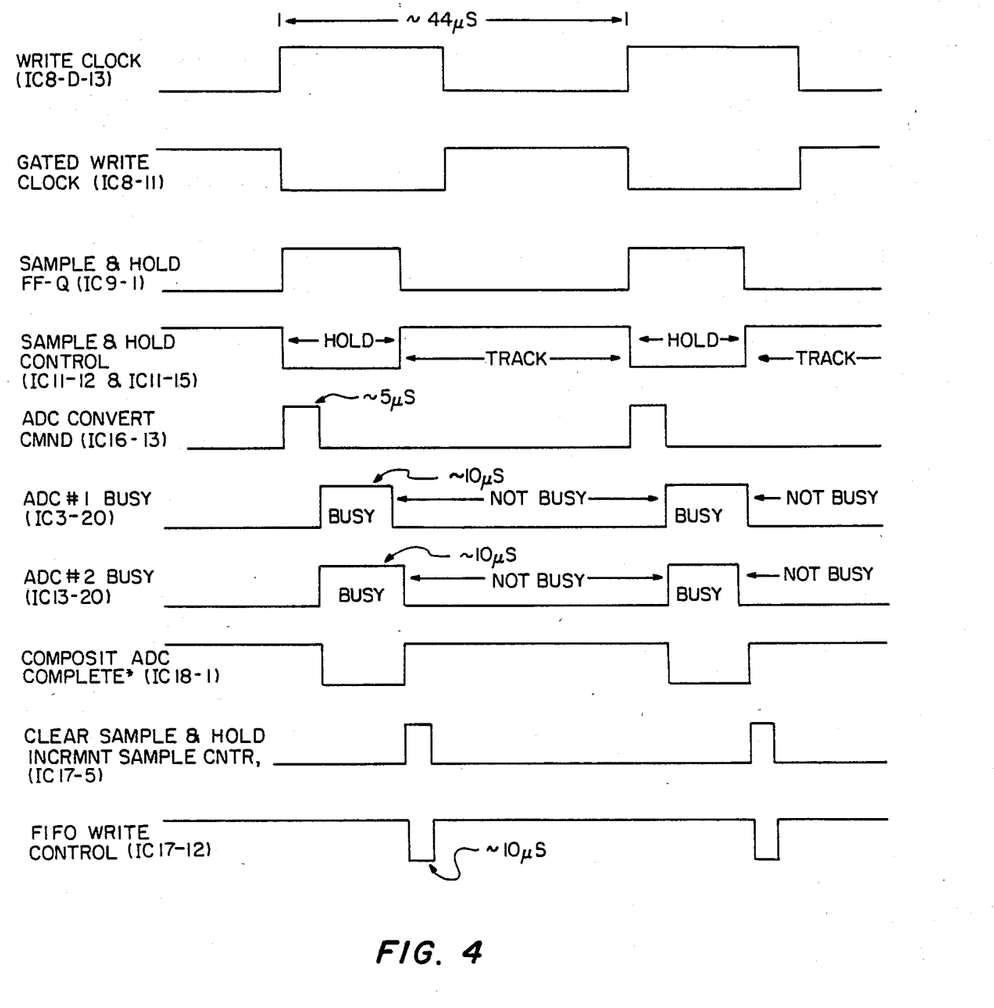
FIG. 4 contains timing diagrams for a write control function as is utilized with the embodiment of the invention described in FIG. 3.

A rising edge of the inverted (*) "write clock" at pin 3 of IC9 causes the Q1 output at pin 1 to go high and to remain HIGH until flip flop IC9 gets reset, see FIG. 4 "SAMPLE & HOLD FF-Q". Gates E and F of IC11 serve as inverting buffer drivers and convert the CMOS drive of IC9 so that IC9 can control sample- and-hold IC4, designated as 128 in FIGS. 1 and 3, as well as sample-and-hold IC7, designated as 128' in FIGS. 1 and 3. Both sample-and-holds, IC4 and IC7, require TTL drive levels. Pin 15 and pin 12 of IC11 are connected to pin 1 of IC4 and pin 1 of IC7 respectively, to control the sample-and-holding of these two devices, see FIG. 4 "SAMPLE & HOLD CONTROL". When the signal at pin 1 of these sample-and-holds drop LOW, it causes the sample-and-holds to switch from a follow mode to a hold mode. The signal at pin 8 of IC4 and IC7 is then a sampled version of the analog signal present at their inputs, pin 13 of each, at the time that the signal at their pins 1 go low. The sampled signal will remain held until the sample/hold control at pin 1 of ICs 4 and 7 go HIGH at the end of a conversion process. Analog to digital converters 128 and 128' designated IC-3 and IC-13 respectively will therefore have a static analog signal for each conversion process.

Coincident with the dropping of the sample/hold control, pin 1 of IC16, a dual retriggerable monostable (one shot) such as a commercially available 74LS123 receives a falling edge which causes the Q1 (pin 13) of the monostable to go HIGH for a nominal five microseconds, see FIG. 4 "ADC CONVERT COMMAND". This signal goes to the convert command input of analog to digital converter 128 (IC3) and analog to digital converter 128' (IC-13) at pin 21 of IC3 and at pin 21 of IC13. The falling edge of the monostable starts the analog to digital conversion process in each of the analog to digital converters. Coincident with the falling edge of the convert command, a busy line of both ADC's, pin 20 of IC3 and pin 20 of IC13, goes HIGH and remains HIGH until the analog to digital conversion process has been completed, see FIG. 4 "ADC #1 BUSY" and "ADC #2 BUSY".

The busy lines of analog to digital converters IC-3 and IC13 are connected to pin 3 and pin 2 respectively of IC18, a TTL quad two input NOR such as a commercially available 74LS02. When both of these busy lines have dropped LOW, indicating that both ADC's IC-3 and IC-13 have completed their conversion, a rising edge will be available at pin 1 of IC-18, see FIG. 4 "COMPOSITE ADC COMPLETE" and at pin 10 of IC17. Integrated circuit 17 is a dual retriggerable monostable (one shot) such as the commercially available 74LS123. This rising edge triggers monostable IC17, for a nominal 1 microsecond pulse. This pulse is available in its noninverted form (HIGH) at pin 5 of IC17, see FIG. 4 "CLEAR SAMPLE & HOLD INCRMNT SAMPLE CNTR", and in its inverted form (LOW) at pin 12. The inverted form of the pulse goes to the write* control input to pin 3 of FIFOs 132 and 132' represented by ICs 2, 6 and 12 in FIG. 3, see FIG. 4 "FIFO WRITE CONTROL". The rising edge of this low pulse causes the three FIFOs to store the digital data available at their inputs into their internal registers. These inputs are connected to the outputs of analog to digital converters IC-3 and IC-13 designated as 128 and 128', respectively. During the FIFO write operation the noninverted pulse at pin 5 of IC17, Which is connected to pin 4 of IC 9, has caused flip flop IC9 to be reset and therefore taken sample-and-holds IC-4 and IC-7 out of hold mode so that the sample-and-holds can now track the analog signals at their inputs. A positive pulse at pin 5 of IC17 is also connected to pin 1 of IC10, a CMOS quad two input NOR, such as the commercially available CD4001, to be used to keep track of the number of samples which have been written into FIFOs 132 and 132', also shown as ICs 2, 6 and 12.

Figure 5:
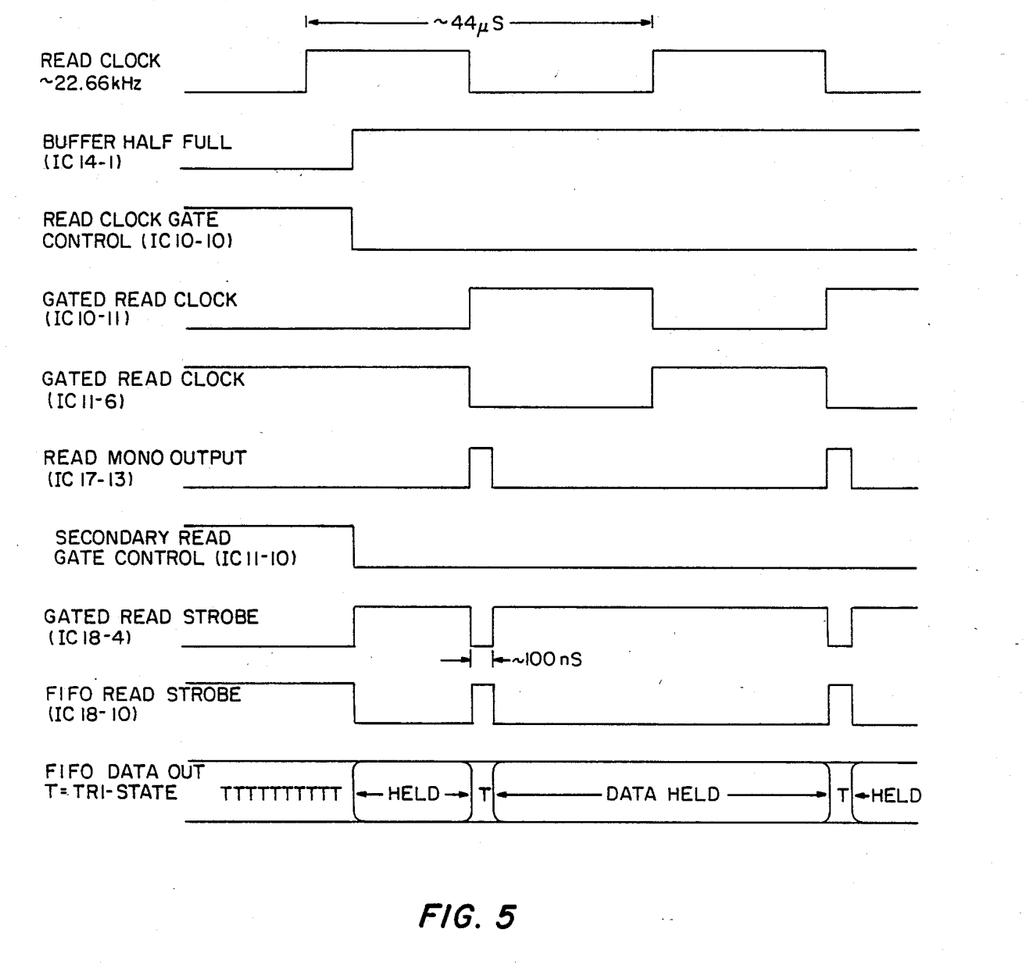
FIG. 5 illustrates timing diagrams for a read control function used with the embodiment of the invention disclosed in FIG. 3.

Referring now to FIGS. 1, 3 and 5 the details and operation of the read control logic elements can be better understood. The read control logic elements of the invention control the output of digital data from FIFOs 132 and 132' to the digital to analog converters, IC-1 and IC-5, under the synchronization control of the locally generated "read clock" 139 so that a corrected analog signal can be generated.

As discussed in the operation of the write control logic above, it was shown that pin 1 of IC10 receives a nominal 1 microsecond pulse each time the sample of digital data was written into the FIFOs 132 and 132'. Integrated circuit 10 serves as a count control gate to IC14 which is a 14 bit binary CMOS counter such as a commercially available CD4020. At the start of reception of data, binary counter IC14 of compensator 100 has been reset making its count state zero and all of its output bits LOW. The Q12 output of counter IC14 is fed back to pin 2 of IC10. While Q12 of IC14 remains LOW, pin 3 of IC10 will pass the inverted form of the signal at pin 1 to pin 10 of IC14. As a result IC14, the "samples written counter", will increment its count state each time a new sample data is written into FIFOs 132 and 132'. This will continue until Q12 goes HIGH when 2048 samples have been written. At this instant pin 2 of IC10 goes HIGH and inhibits any more count pulses from passing onto the counter. The Q12 of counter IC14 therefore goes HIGH when 2048 samples, indicating a half full buffer, have been written and remains HIGH until after the loss of the receive carrier signal, see FIG. 5 "BUFFER HALF FULL".

The inverted form of the "buffer half full" signal is connected to pin 13 of IC10 and serves as a gate control for the locally generated "read clock" 139 which is available at pin 12 of IC10. As a result, until 2048 samples have been written into FIFOs 132 and 132', "read clock" 139 is inhibited. After the buffer of these FIFOs are half full, the inverted form of "write clock" 122 will be available at pin 11 of IC10 and will continue to be available until the system has been reset after a carrier loss has been detected, see FIG. 5 "GATED READ CLOCK". Gate-C of IC11 serves an inverting buffer drive which convert the CMOS drive at pin 11 of IC10 into TTL drive for pin 1 of IC17. Integrated circuit 17 serves as a monostable which generates a nominal 100 nanosecond positive pulse at its pin 13 whenever it receives a falling edge at pin 1. Thus, at every falling edge of gated "read clock" 139 a positive pulse is generated at pin 13 of IC17, see FIG. 5 "READ MONO INPUT". This pulse goes to pin 5 of IC18, a TTL quad two input NOR such as a 74LS02, which in this embodiment serves as a single gate under control of the signal at pin 6. In FIG. 3, IC18 is made up of elements A, B, C and D. The signal at pin 6 will always be low at the time of passing any "read" pulses. Its purpose will be discussed later under reset operation. Since gate IC18 can be considered as always enabled, then pin 10 of IC18 will have an exact replica of the 100 nanosecond positive pulse generated by the monostable at pin 13 of IC17. This replica of the signal at pin 13 is connected to the read* controls of the FIFOs at pin 15 of IC2, IC6 and IC12. The output of these FIFOs will be tristated while the signal at their read* pin is HIGH. On the falling edge of each pulse, the FIFOs will read a sample of data from their internal buffers and hold it latched at their digital output pins until the read* line again goes HIGH. The output of the FIFOs is continuously converted to analog voltages by the two digital to analog converters, IC1 and IC5.

Figure 6:
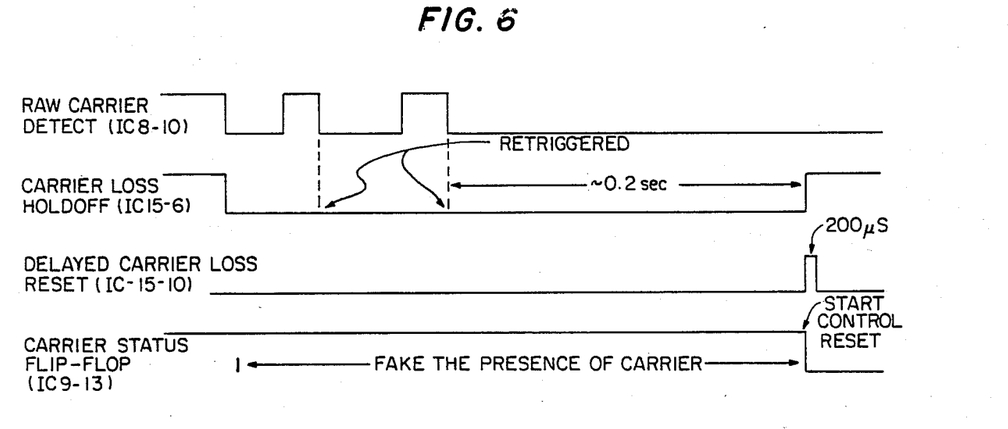
FIG. 6 illustrates timing diagrams for "reset" timings as are utilized with the embodiment of the invention shown in FIG. 3.

Referring now to FIGS. 1, 3 and 6 the carrier detect and reset logic element and operation will be discussed. The carrier detect and reset logic performs three functions: (1) a power-on reset to remaining compensator 100 elements; (2) the sensing of the presence of a carrier; and (3), when the carrier disappears, deceives the receive modem and remaining receive electronics into perceiving that the carrier is still present. This last function is performed so that all samples stored in the FIFOs 132 and 132' have been converted to analog, at which point control logic 116 undergoes a controlled reset to await the arrival of a next carrier detect.

The carrier detect and reset logic centers around a set/reset flip-flop formed by part B of IC9. Flip-flop IC9-B holds the present status of the carrier detect. When a carrier is detected, pin 8 of IC8 goes LOW. Provided that a power-on reset of compensator 100 is not taking place, pin 9 of IC8 will also be LOW. Pin 10 of IC8 will therefore go HIGH when a carrier is detected, see FIG. 6 "RAW CARRIER DETECT". Since this signal is connected to the set input, pin 8 of flip-flop IC9-B, the flip-flop will remain set as long as the carrier is detected. When the carrier goes away, flip-flop IC9-B remains set until it receives a HIGH at its reset pin, pin 10 of IC9. When the carrier goes away, it causes a negative edge at pin 5 of IC15, a CMOS dual retriggerable monostable (one shot) such as a commercially available MC14538B. Pin 5 of IC15 is a negative edge triggered input to a retriggerable monostable so that when the carrier is lost a monostable fires for a nominal 0.2 seconds. Each time the carrier comes back and is lost again the monostable gets refired to start another 0.2 second interval regardless of whether or not it has completed the last interval.

The output of monostable IC15 is active LOW and is available at pin 6 of the monostable, see FIG. 6 "CARRIER LOSS HOLDOFF". When monostable IC15 times out it provides a rising edge at pin 12. This causes a second monostable to fire for a nominal 200 microseconds. The 200 microsecond positive pulse is available at pin 10 of IC15, see FIG. 6 "DELAYED CARRIER LOSS RESET", and will be used to reset the carrier detect set/reset flip-flop IC9-B. The 200 microsecond pulse passes to pin 10 of IC9 via gates A and B of IC8. If a carrier is still not present, that is if the set input pin 8 of IC9 is LOW, then the carrier detect flip-flop IC9-B gets reset. However, if a carrier has come back up and remains up for the full 200 microsecond duration of the reset pulse, the set overrides reset and the flip-flop IC9-B remains set.

The status of carrier detect flip-flop IC9-B is available at its Q to output at pin 13, see FIG. 6 "CARRIER STATUS FLIP-FLOP". This output will be HIGH if the flip-flop is set and LOW if it is reset. Gate B of IC10 performs two functions. One function is to reset sample counter IC-14 by providing a HIGH to pin 11 of the counter when the carrier has gone away. This ensures that counter IC14 will start at a zero state during the next reception of an incoming transmission and will get a correct count for a FIFO buffer half full. A second function of gate IC10-B is to pass a carrier detect* to receiving modem electronics. This is required since it is not desired for the receiving modem to sense the loss of the carrier until all samples remaining in FIFOs buffers have been processed.

Gate IC11-B converts the CMOS signal at pin 13 of IC9 to TTL drive levels for input to pin 12 of IC18. Pin 13 of IC18 provides the TTL level negative-true reset inputs to the necessary TTL packages, pin 3 of IC16, and pin 22 of IC2, IC6 and IC12 in order to hold them reset at the end of a receive cycle.

Figure 7:
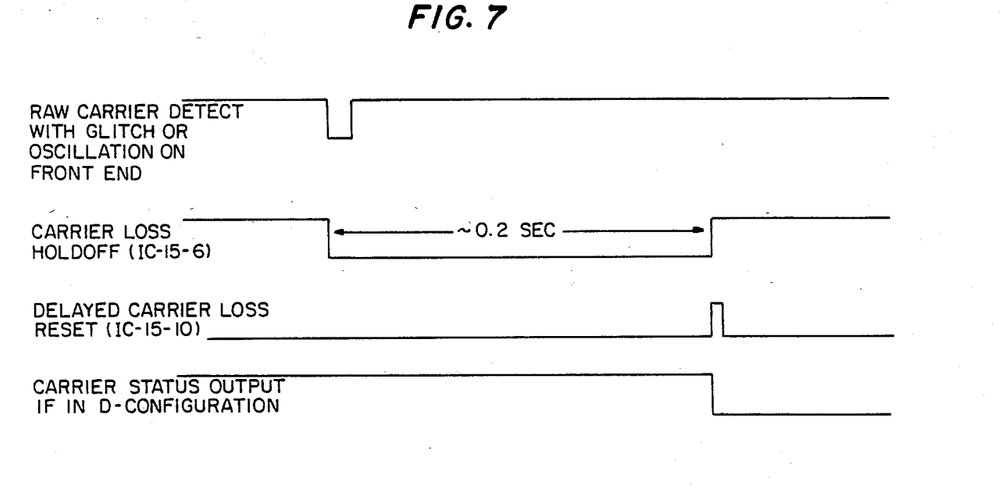
FIG. 7 illustrates timing diagrams corresponding to more narrowly focused processes as are used with the embodiment of the invention shown in FIG. 3.
Figure 8:
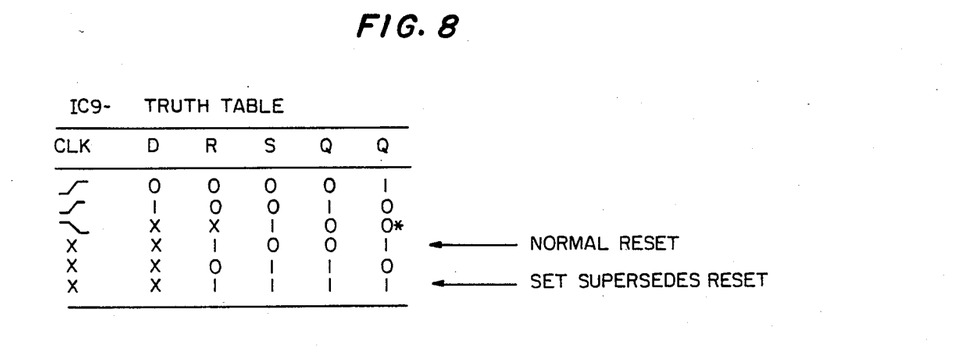
FIG. 8 is a truth table for a flip-flop as is utilized with the embodiment of the invention show in FIG. 3.

Though those skilled in the art will realize that the elements of FIG. 3 are largely self-explanatory, these elements and their operation will be further explained so as to aid in this understanding. Referring now to FIGS. 3, 7 and 8 further details as to carrier detect flip-flop IC9-B will become apparent. Flip-flop IC9-B is used as a SET-RESET configuration. This is done to preclude loss of all or part of a transmission if an oscillation on the front edge of a carrier detect or a noise glitch occurs.

Referring to FIG. 7 it can be seen that a momentary loss of a carrier due to a noise glitch or an oscillation on start-up would fire the Carrier Loss Holdoff monostable at IC15, pin 6, on the falling edge. This would cause the monostable of IC-15 to fire the Delayed Carrier Loss Reset monostable, IC-15 at pin 10, 0.2 seconds later. If Carrier Detector flip-flop IC9-B had been in a D-configuration with the clock tied to pin 10 of IC8 at gate C, then the Q output would have been properly set on the rising edge of the carrier detect however 0.2 seconds later the flip-flop would get reset and stay reset until the next rising edge of a carrier detect. In the IC9-B/CD4013 truth table provided in FIG. 8, it should be noted that in the SET-RESET configuration, SET supersedes RESET. Therefore, even though a glitch may plant a "seed" for an inappropriate delayed reset, if the carrier is backed up at the SET input the RESET will be ignored. This would not be a problem during normal operations, if a carrier is truly lost when the delayed reset comes along, the SET input will be LOW and a normal reset will take place. It should be noted that the SET overriding RESET holds only for the Q output and not for the Q* output.

Referring now to first in first out shift registers 132 and 132' of FIG. 1 and as represented by IC-2, IC-6 and IC-12 in FIG. 3, further details of thee registers will be discussed. Each FIFOs requires a LOW input at their RS* pins for reset, pin 22 of IC-2, IC-6 and IC-12. These FIFOs also require that their W*, pin 1, and R*, pin 15, inputs be HIGH for a minimum of 50 nanoseconds prior to and a minimum of 15 nanoseconds following the rising edge of the reset signal. If these requirements are not met an indeterminate state may result in the FIFOs and their internal buffer pointers may become scrambled.

The R* signal comes from pin 10 of NOR IC18-C. When this reset occurs, the sample counter, IC14, gets reset. This causes the Q12 output to go LOW and by way of gate D of IC11 provides a HIGH at pin 6 of IC18. As a result, pin 4 of IC18 goes LOW regardless of the input at pin 5 and results in pin 10 of IC18 being HIGH at the beginning of a reset. This signal will remain HIGH for the duration of the reset since Q12 of IC14 is held LOW during the reset period. Providing that the reset stays in effect for a minimum of 15 nanoseconds, the front end requirements for R* to be HIGH are met. After the rising edge of the reset Q12 of IC14 will remain LOW until the FIFO buffer is half filled, in this instance with 2048 samples. This operation is guaranteed to take more than 15 nanoseconds thereby guaranteeing that the "back end" requirements on R* are met.

The W* reset requirements are more complicated than those for R*. When a reset arrives, pin 3 of IC16 is pulled LOW and is held LOW for the duration of the reset. From the previous discussion on carrier detect, for a reset to occur, the carrier has to be continuously lost for a period of at least 0.2 seconds. Therefore, the last "start" of "convert" to the analog to digital converter, 128 and 128', had to have been at least 0.2 seconds before. These ADCs perform a conversion in about 100 microseconds, therefore it is known that they completed the last conversion some time ago. As a result the ADCs BUSY status output has been LOW for a long enough period that the WRITE control monostable, IC17-B, has already been timed out and therefore its Q* output at pin 12 is HIGH and will remain HIGH until the end of the next analog to digital conversion. The "front end" requirements on W* are therefore met.

When the reset goes away, W* will remain HIGH until pin 10 of IC17 sees a rising edge, thereby signifying that both ADCs have completed a new conversion. It should be noted that no conversion could get started until a carrier was detected, which would coincide with the reset going away, and that it will take the ADCs about 100 microseconds to do the conversion process. The "backend" requirements for W* are therefore met.

From the above it can be seen that the only way to violate the FIFO reset requirements is to have the reset duration be too short. Though this is possible, it is unlikely. In a worst case scenario where the reset duration is too short, the worst that will happen is that the transmission will be scrambled and that the system would recover completely upon the detection of the next carrier.

The FIFOs are utilized in the invention as computer memory and as such are very fast. The FIFOs have tri-state outputs with data outputs normally latched by external devices during a read operation. These FIFOs expect to see a narrow LOW read pulse during which they will transfer the contents of their internal buffer to their data outputs and hold it there until the rising edge of a read pulse. Extra chips providing a data latching function were done away with by assuming that the rising edge of the read pulse will cause external latches to grab and hold the FIFOs output. After the read pulse goes HIGH the FIFO outputs return to tri-state.

Additionally chips requiring a data latching function were avoided by giving the FIFO a very wide LOW read pulse with a narrow HIGH interval in between rather than a narrow LOW read pulse. During the period that the read pulse is LOW the FIFOs essentially become their own latches while they hold data at their outputs awaiting the rising edge of a read pulse. When the read pulse goes HIGH, the FIFOs return to their tri-state condition only to immediately receive another wide LOW read pulse. As a result, a majority of the time the outputs of the FIFOs serve as latches. The tri-state period between latch intervals were chosen to be such at the digital to analog converters, 140 and 140', would not be able to respond so that the absence of true latches would not be evident at the analog outputs of the DACs. This can be visualized by considering the read pulses as narrow HIGH signals, explaining why the R* inputs to the FIFOs appear to be the wrong logic polarity.

Of course those skilled in the art will realize that the specific embodiment disclosed in FIG. 3 is merely a representative way in which the function of the invention may be performed. The specific logic of elements disclosed and their arrangement are by no means the only way or even one of a few ways by which the logic functions of the invention may be carried out. Further, the invention is by no means limited to the frequencies disclosed nor is it limited to acoustic communications. Those knowledgeable in the communications field will realize that within sound engineering principles, the Doppler effect compensator of the invention can be applied to electromagnetic as well as acoustic communications.

Those skilled in the art will realize that these and other modifications and variations of the invention are possible in light of the above teachings. Therefore, it is to be understood that within the scope of the following claims the invention may be practiced otherwise than as specifically described.

What is claimed is:

1. A system for transmitting information from a remote station to a local station wherein a signal transmitted is subject to Doppler effect comprising:
   means positioned at said remote station for transmitting a transmit information signal, and for simultaneously transmitting a transmit reference signal;
   said transmit information signal and said transmit reference signal both being subject to the same Doppler effect during transmission;
   means positioned at said local station for receiving a receive information signal that comprises said transmit information signal as received by said receiving means and that may be Doppler effected, and for receiving a receive reference signal that comprises said transmit reference signal as received by said receiving means and that may be Doppler effected; and
   means positioned at said local station and operably coupled to said receiving means for sampling said receive information signal at a rate corresponding to a characteristic of said receive reference signal.

2. A system as described in claim 1 in which:
   said characteristic is the frequency of said receive reference signal.

3. A system as described in claim 1 further including:
   means positioned at said local station and operably coupled to said sampling means for generating an information signal from samples of said receive information signal so that said generated information signal is substantially identical to said transmit information signal.

4. A system as described in claim 3 in which:
   said characteristic is the frequency of said receive reference signal.

5. A system as described in claim 4 in which said means for generating said information signal includes:
   means for storing said samples of said receive information signal.

6. A system as described in claim 4 in which:
   said transmit reference signal has a predetermined characteristic; and
   said means for generating generates said information signal from said samples of said receive information signal at a rate corresponding to said predetermined characteristic of said transmit reference signal.

7. A system as described in claim 6 in which said means for generating said information signal includes:
   means for storing said samples of said receive information signal; and
   means operably coupled to said means for storing for retrieving said samples at a retrieval rate corresponding to said predetermined characteristic of said transmit reference signal.

8. A system as described in claim 7 in which:
   said predetermined characteristic is the frequency of said transmit reference signal.

9. A system as described in claim 1 in which said sampling means comprises:
   a sample and hold network for sampling said receive information signal at a sample rate that corresponds to said characteristic of said receive reference signal.

10. A system as described in claim 9 in which:
    said characteristic is the frequency of said receive reference signal.

11. A system as described in claim 7 in which said means for storing includes:
    a first in, first out memory device.

12. A system as described in claim 11 in which said first in, first out memory device includes a counter for counting the number of samples stored within said device.

13. A system as described in claim 12 in which said sampling means comprises:
    a sample and hold network for sampling said receive information signal at a sample rate that corresponds to the frequency of said receive reference signal.

14. An improved communications system in which an information signal and a reference signal are simultaneously transmitted from a transmitter in which said information signal and said reference signal are subject to the same Doppler effect during transmission, the information signal and the reference signal being received at a receiver with a received information signal comprising the information signal as received by the receiver and as may be Doppler effected and a received reference signal comprising the reference signal as received by the receiver and as may be Doppler effected, the improvement comprising:
    means operably coupled to said receiver for sampling said received information signal at a rate corresponding to a characteristic of said received reference signal.

15. An improvement as described in claim 14 further comprising:
    means operably coupled to said sampling means for generating a reconstructed information signal from samples of said received information signal so that said reconstructed information signal is substantially identical to said information signal as transmitted.

16. An improvement as described in claim 15 in which said generating means generates said reconstructed information signal at a rate corresponding to a predetermined characteristic of said reference signal as transmitted.

17. An improvement as described in claim 16 in which:
    said characteristic of said received reference signal is the frequency of said received reference signal.

18. An improvement as described in claim 17 in which:
said predetermined characteristic of said reference signal is the frequency of said reference signal.

19. A method for correcting Doppler effect affecting a transmission of information from a transmitter to a receiver comprising the steps of:
transmitting simultaneously an information signal and a reference signal from said transmitter;
the transmission of said information signal and said reference signal both being subject to the same Doppler effect during the transmission;
receiving upon said receiver a received information signal that comprises said information signal as received and that may be Doppler effected, and receiving a received reference signal that comprises said reference signal as received and that may be Doppler effected;
sampling said received information signal at a sample rate corresponding to a characteristic of said received reference signal; and
generating a reconstructed information signal from samples of said local information signal that is substantially identical to said information signal as transmitted.

20. A method as described in claim 19 in which the characteristic of said received reference signal is the frequency of said received reference signal.

21. A method as described in claim 19 in which the step of generating includes generating said reconstructed information signal at a rate corresponding to a predetermined characteristic of said reference signal as transmitted.

22. A method as described in claim 21 in which the characteristic of said received reference signal is the frequency of said received reference signal and in which the predetermined characteristic of said reference signal is the frequency of said reference signal.

23. A method as described in claim 21 in which the step of generating includes the steps of:
storing said samples; and
retrieving said samples at said rate corresponding to said predetermined characteristic of said reference signal as transmitted.

24. A method as described in claim 23 in which the characteristic of said received reference signal is the frequency of said received reference signal and in which the predetermined characteristic of said reference signal is the frequency of said reference signal.

* * * * *